Figure 1:
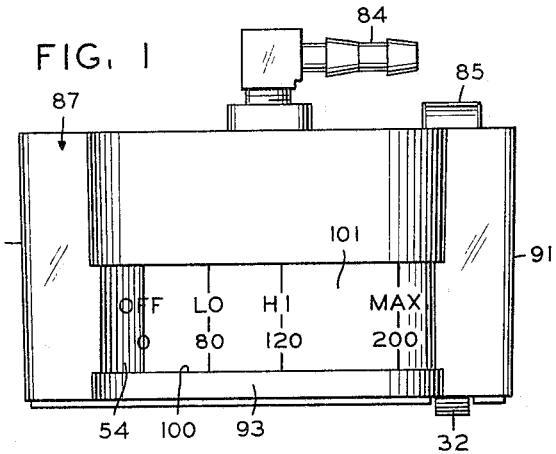

Nov. 29, 1966 B. C. CRANAGE 3,288,165
COMBINED GAUGE AND REGULATOR
Filed Feb. 5, 1964 4 Sheets-Sheet 1

INVENTOR
BIDWELL CHAPMAN CRANAGE
BY
Cohn and Powell
ATTORNEYS

Nov. 29, 1966  B. C. CRANAGE  3,288,165
COMBINED GAUGE AND REGULATOR
Filed Feb. 5, 1964  4 Sheets-Sheet 2
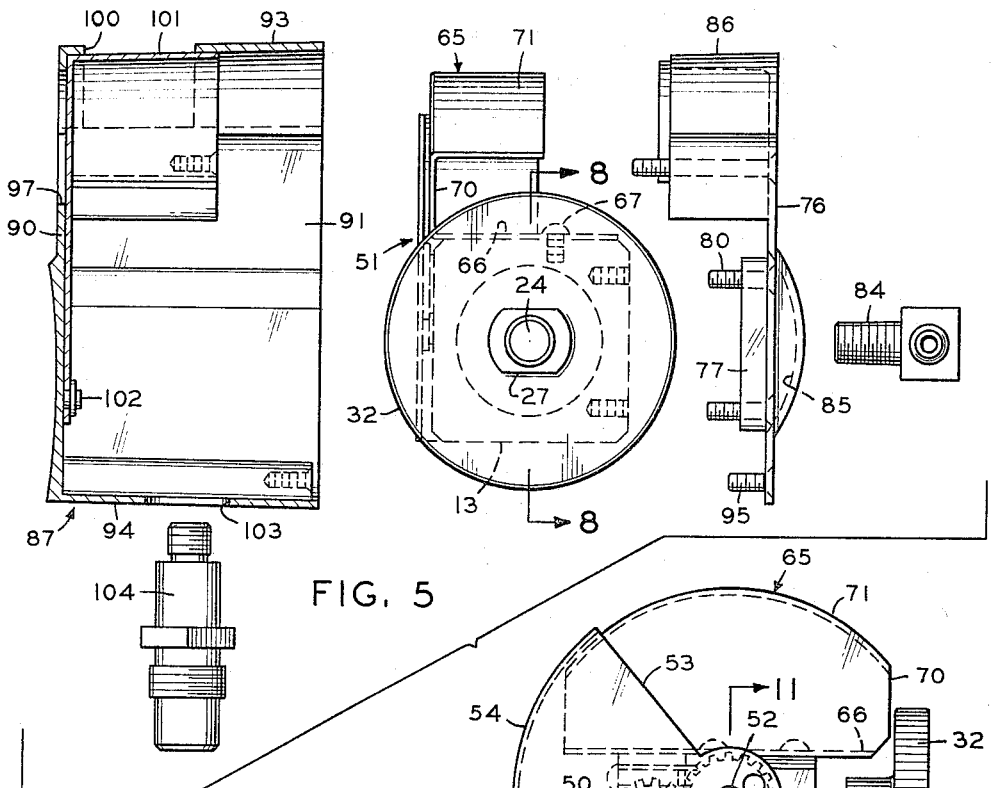
FIG. 5
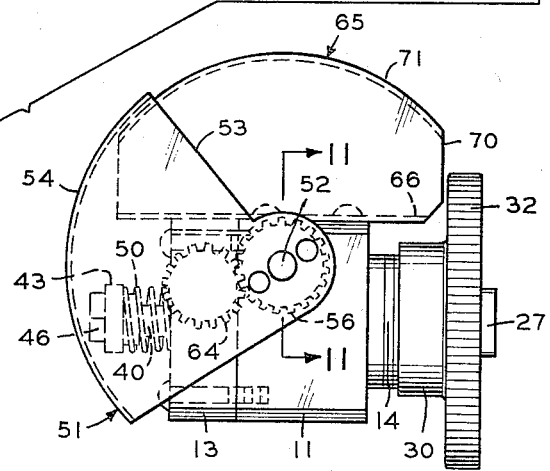
FIG. 6
FIG. 7
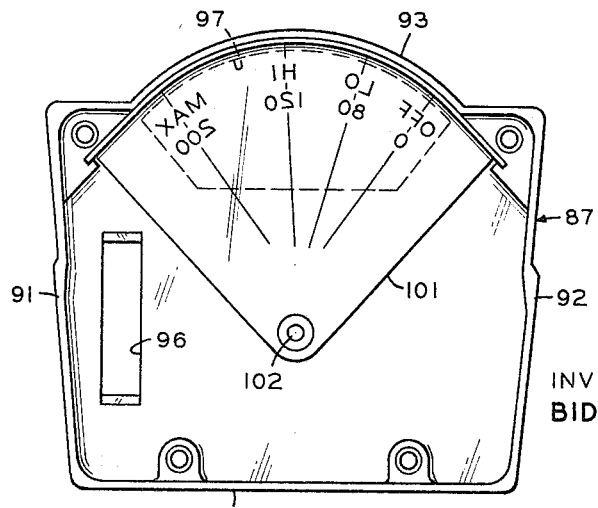
INVENTOR
BIDWELL CHAPMAN CRANAGE
Cohn and Powell
ATTORNEYS Nov. 29, 1966  B. C. CRANAGE  3,288,165
COMBINED GAUGE AND REGULATOR
Filed Feb. 5, 1964  4 Sheets-Sheet 3

INVENTOR
BIDWELL CHAPMAN CRANAGE
BY
Cohn and Powell
ATTORNEYS

United States Patent Office 3,288,165
Patented Nov. 29, 1966

1

3,288,165
COMBINED GAUGE AND REGULATOR
Bidwell Chapman Cranage, Ferguson, Mo., assignor to Stile-Craft Manufacturers, Inc., St. Louis, Mo., a corporation of Missouri
Filed Feb. 5, 1964, Ser. No. 342,826
8 Claims. (Cl. 137—505.13)

This invention relates generally to improvements in a combined gauge and regulator, and more particularly to an improved mechanism for indicating pressure in a flow line in which the device is installed and for regulating and limiting flow through the line.

An important object is achieved by the provision of means adjustably mounting a valve seat in the valve body in order to set the valve orifice provided in the movable valve seat at a predetermined distance from a flexible element such as a diaphragm which is adapted operatively to open or close such valve orifice, whereby the pressure in the valve chamber at one side of the flexible element at which the flexible element will operatively open or close the orifice can be accurately regulated.

Another important objective is realized by reciprocatively mounting a rod in the body for movement toward or away from the flexible element, the rod being provided with the discharge orifice that communicates with the chamber at one side of the flexible element and which is operatively opened or closed by the flexible element. The rod extends into the chamber and can be precisely positioned relative to the flexible element so that the flexible element will operatively close the orifice and stop flow at a predetermined pressure.

Still another important object is provided by the structural arrangement of the parts for actuating the rod. Briefly, a sleeve is threadedly connected to a rod portion, and a knob is attached to the sleeve for turning the sleeve, both the knob and sleeve being precluded from movement relative to the valve body, while a key means precludes rotation yet enables rectilinear movement of the rod upon actuation of the knob.

An important object is afforded by the attachment of the flexible element on a plunger that is reciprocatively mounted in the valve body, and by the operative connection of a resilient means to the plunger to exert a force on the flexible element in opposition to the pressure in the chamber exerted on one side of the flexible element as mentioned previously. Other advantages are attained by the operative interconnection of the plunger with a gauge means that indicates the responsive position of the plunger upon movement of the flexible element.

Another important object is achieved by the provision of means that is adjustably connected to the plunger for selectively varying the loading of the resilient means on the flexible element in order to provide a corrected initial setting of the gauge means so that the gauge means reflects the true pressure condition in the flow passage through the valve body.

Yet another important objective is realized by providing a rack on the plunger which meshes with a pinion of a drive gear train that is interconnected with a pivotally mounted gauge means, whereby the rectilinear movement and position of the plunger is reflected by the corresponding rotative movement and position of the gauge means.

An important object is provided by the resilient mounting of a valve member on the flexible element so that the valve member yields under its resilient loading when the valve member engages the valve seat and closes the discharge orifice, whereby to provide an effective valve operation.

It is an important objective to provide a combined gauge and regulator that is simple and durable in construction, economical to manufacture and assemble, high-

2 ly efficient in operation, and which can be readily utilized by anyone with little or no instruction.

Figure 4:
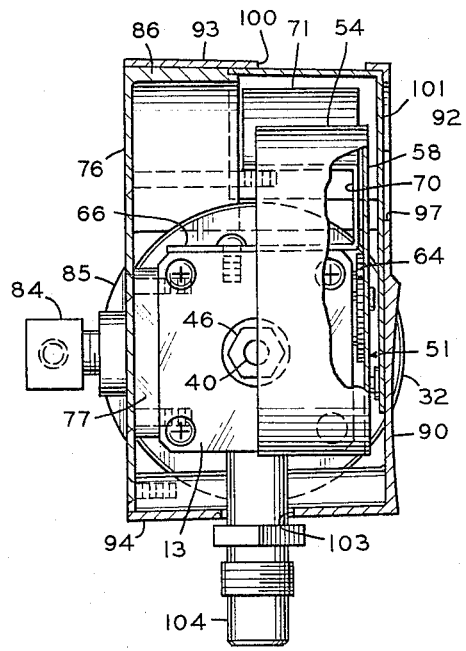
Figure 2:
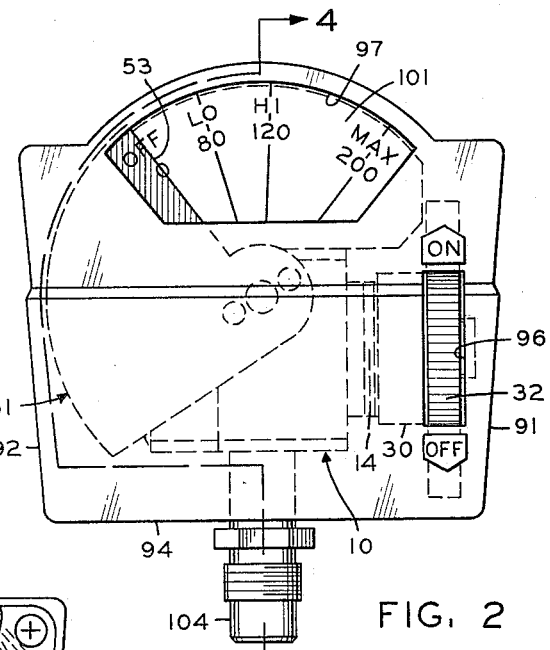
Figure 3:
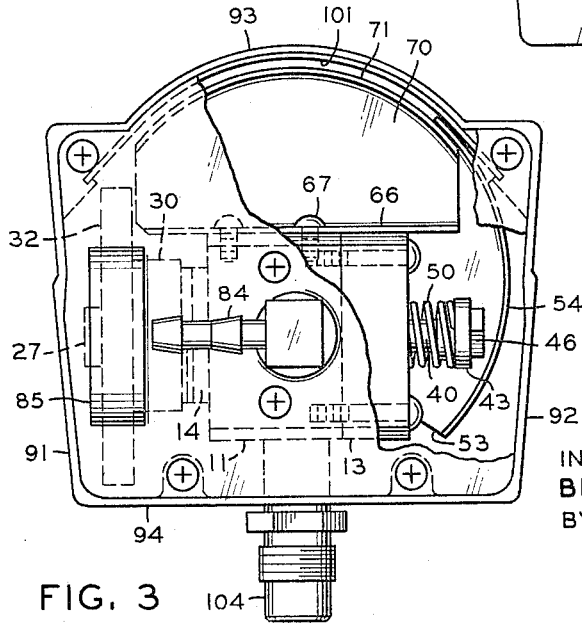
Figure 9:
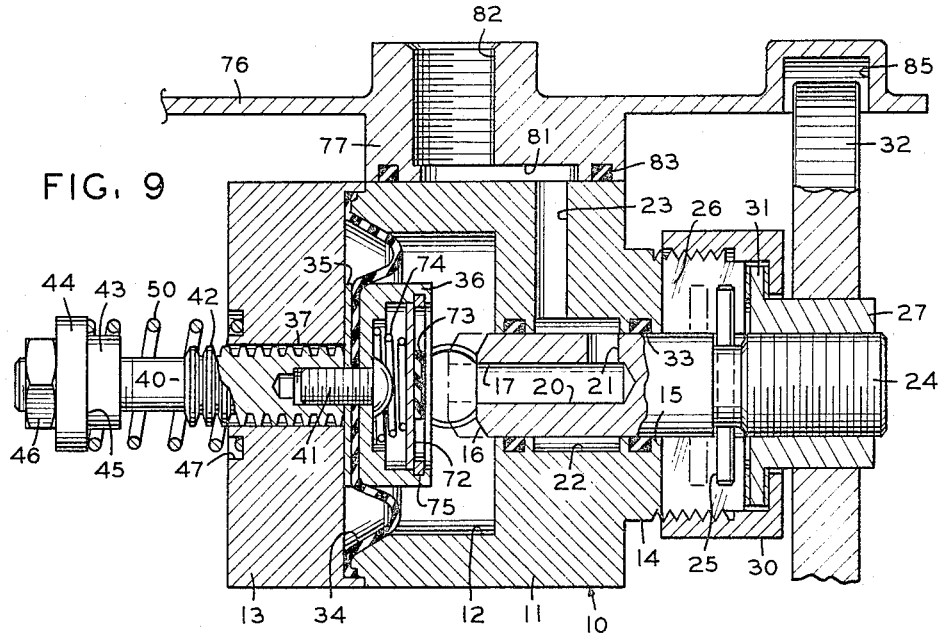
Figure 8:
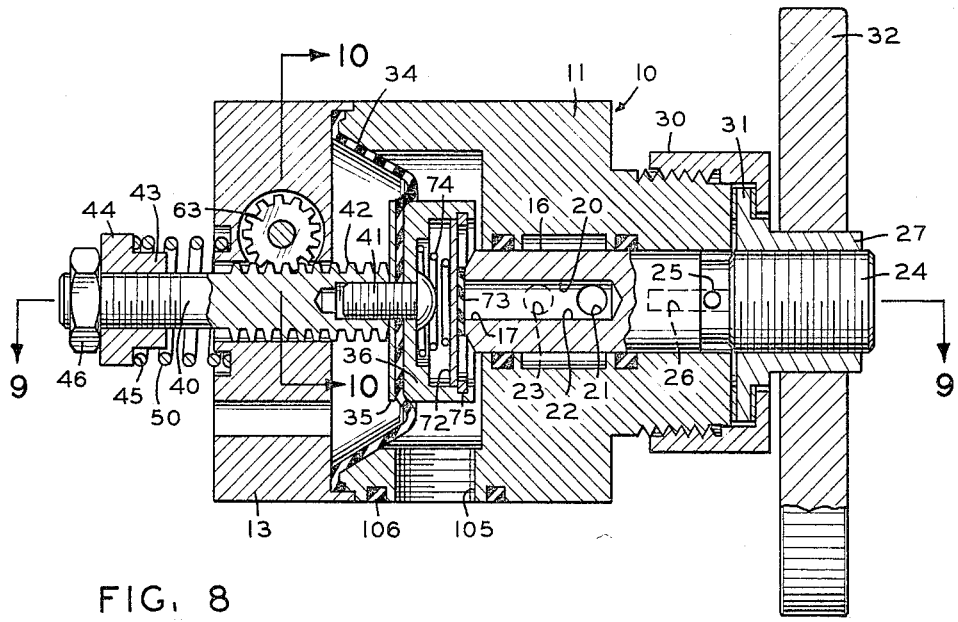
Figure 10:
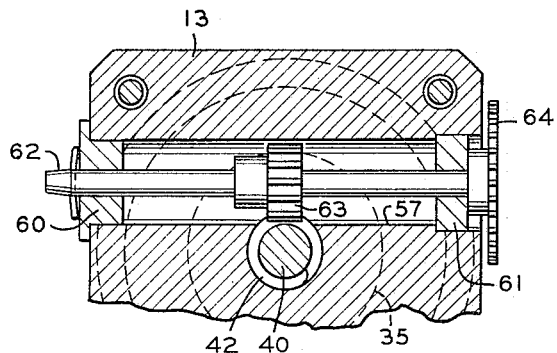
Figure 11:
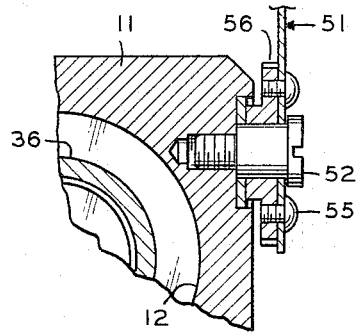
Figure 12:
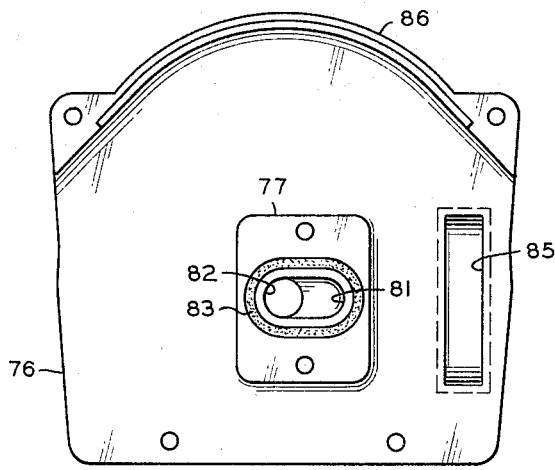

The foregoing and numerous other objects and advantages of the invention will more clealy appear from the following detailed description of a preferred embodiment, particularly when considered in connection with the accompanying drawings, in which:

FIG. 1 is a top plan view of the combined gauge and regulator assembly;
FIG. 2 is a front elevational view;
FIG. 3 is a rear elevational view, partially cut away to show the internal mechanism;
FIG. 4 is a cross sectional view as seen along staggered line 4—4 of FIG. 2;
FIG. 5 is an exploded view of the casing and valve body;
FIG. 6 is a rear elevational view of the front casing plate;
FIG. 7 is a front elevational view of the valve body;
FIG. 8 is a cross sectional view of the valve body as seen along line 8—8 of FIG. 5, illustrating the diaphragm and discharge orifice in a relatively closed position;
FIG. 9 is a cross sectional view as seen along line 9—9 of FIG. 8, illustrating the diaphragm and discharge orifice in a relatively open position;
FIG. 10 is a cross sectional view as seen along line 10—10 of FIG. 8;
FIG. 11 is an enlarged cross sectional view as seen along line 11—11 of FIG. 7, and
FIG. 12 is a front elevational view of the rear casing plate.

Referring now by characters of reference to the drawings, it is seen that the combined gauge and regulator includes a valve body generally indicated by 10, such body 10 having a center body portion 11 provided with an internal chamber 12 that is open at one end. The chamber 12 is closed by an end cap 13. The opposite end of the center body portion 11 includes an integral threaded neck 14.

An axial bore 15 is formed in the center valve body portion 11, the bore 15 extending through the neck portion 14 and communicating with the chamber 12. Reciprocatively mounted in the bore 15 is a rod 16 constituting a valve seat, one end of the rod 16 extending into the valve chamber 12.

Formed in the inner end of rod 16 is a discharge orifice 17. A short passage 20 communicates with the discharge orifice 17 and extends axially along the rod 16. A short transverse port 21 places this rod passage 20 in direct communication with an enlarged circumferential pocket 22 in the center body portion 11 along the bore 15. The port 21 communicates with the pocket 22 in any position of the rod 16 within its range of reciprocative movement along bore 15. Another passage 23 formed in the center valve body portion 11 places the pocket 22 in communication with the outside of the valve body 10.

The rod 16 includes an outermost threaded end portion 24. A transverse pin 25 extends through and is held by the rod 16 just ahead of the threaded end portion 24, the outermost ends of the pin 25 being slidably received in a key slot 26 formed in the threaded neck portion 14. The interconnection of the key pin 25 in the key slot 26 enables rectilinear reciprocative movement of the rod 16 in the valve body. In other words, the pin 25 precludes the rod 16 from rotation, but the key slot 26 permits longitudinal axial movement of such rod 16.

Threadedly mounted on the threaded rod end 24 is a sleeve 27. The sleeve 27 is fixed to the neck portion 14 of the valve body 11 by a retaining cap 30 that is threadedly connected to the neck portion 14. The retaining cap 30 receives an annular projecting flange 31 formed integrally on the sleeve 27. A pair of washers, one washer mounted on each side of the sleeve flange 31, mounts the sleeve 27 between the neck portion 14 and the cap 30 for rotation.

Drivingly attached to the sleeve 27 is a knob 32, the rim of which is knurled or otherwise formed to present a surface that can be effectively engaged by the fingers to turn the knob 32 and hence rotate the sleeve 27. Because the knob 32 and the sleeve 27 can rotate but cannot move axially relative to the valve body 11, rotation of these parts will cause a reciprocative longitudinal movement of the rod 16 as the threads of the sleeve 27 engage the threads of the rod end portion 24.

In order to provide an effective seal between the reciprocative rod 16 and the valve body portion 11, a pair of O-rings 33 are located one at each side of the bore pocket 22, the O-rings 33 preventing leakage of the flow from the rod port 21 and bore pocket 22 and yet enabling reciprocative movement of rod 16.

Extending across the chamber 12 is a diaphragm 34 constituting a flexible motor element, the periphery of the diaphragm 34 being fixed between center valve body portion 11 and the end cap 13. A rigid backing plate 35 is located immediately behind the center portion of the diaphragm 34 for reinforcement. A cup 36 is located at the front side of diaphragm 34 and covers substantially the same corresponding center portion directly opposite the backing plate 35.

Reciprocatively mounted in a bore 37 formed in the end cap 13 is a plunger 40. The plunger 40 is aligned axially with the reciprocatively mounted rod 16. The inner end of plunger 40 abuts the backing plate 35 and is effectively secured to the diaphragm 34 by a screw 41 extending through the cup 36, diaphragm 34, backing plate 35 and threadedly engaging the plunger 40. Thus it is seen that the plunger 40 will move reciprocatively in response to flexing action of the diaphragm 34.

That portion of plunger 40 that is reciprocatively and slidably mounted in the bore 37 is provided with a rack 42 formed by annular teeth. The purpose and function of rack 42 will be later described.

The outermost end of plunger 40 is threaded to receive an adjusting nut 43, the nut 43 including an annular flange 44 that presents a shoulder 45. The adjusting nut 43 is maintained in any axially adjusted position on the rod 40 by a lock nut 46 also threadedly connected to the plunger 40 and engaging the back side of the adjusting nut 43.

The outer face of the end cap 13 is provided with an annular recess 47 about the plunger 40. A compression spring 50 is located about the plunger 40 between the adjusting nut 43 and the end cap 13. More particularly, one end of spring 50 engages the shoulder 45 of the adjusting nut 43 while the opposite end of the spring 50 is received in the annular recess 47 and engages the end cap 13. The spring 50 tends to urge the plunger 40 outwardly to its fully extended position as illustrated in FIG. 9 in which the backing plate 35 abuts the inner surface of the end cap 13, the spring 50 constituting a resilient means that places a pressure on the diaphragm 34 that is in direct opposition to the pressure in chamber 12 exerted on one side of the diaphragm 34. The pressure exerted by the spring 50 can be accurately determined by a threaded adjustment of nut 43 on plunger 40.

A gauge means is provided to indicate visually the pressure in chamber 12, such gauge means acting automatically in response to the relative axial position of plunger 40 in its range of reciprocative movement upon flexing action of the diaphragm 34. This gauge means includes a flag 51 pivotally mounted to the center valve body 11 by pivot pin 52. The flag 51 consists of a flat substantially vertical portion 53 and an inturned arcuate portion 54 as is best seen in FIGS. 3 and 4. Also pivotally mounted on pivot pin 52 and drivingly attached to the flag 51 by fasteners 55 is a gear 56.

The center valve body 11 is provided with a transverse bore 57 arranged substantially at a right angle to and immediately above the plunger bore 37. Rotatively mounted in transverse bore 57 by end bearings 60 and 61 is a shaft 62. A pinion 63 is drivingly attached and rotatable with the shaft 62, the pinion 63 being located within the transverse bore 57 and operatively meshing with the rack 42 of the reciprocative plunger 40. One end of shaft 62 is attached to another gear 64 that meshes operatively with the flag gear 56.

As the plunger 40 reciprocates in its rectilinear movement in response to the flexing action of diaphragm 34, the rack 42 will rotate the pinion 63 and its shaft 62, and hence rotate the pivoted flag 51 through the interconnection of the meshing gears 64 and 56. The position of the flag 51 will indicate on a suitable scale the pressure condition in the valve chamber 12.

A target plate 65 is held by the valve body 10. More specifically, the target plate 65 includes a horizontal flat base portion 66 fixed by screws 67 to the top surface of the center valve body portion 11, an integral substantially vertical portion 70 immediately behind the flat vertical flag portion 53, and a reversed arcuate portion 71 that underlies the arcuate flag portion 54.

A valve member that cooperates with the discharge orifice 17 of rod 16 is attached to and carried by the diaphragm 34. Located within the cup 36 is a disc 72, the outer periphery of which closely approximates the internal diameter of cup 36. Attached to the outer face of disc 72 is a resilient pad 73 constituting a valve member that is adapted to engage the end of the rod 16 and to close the discharge orifice 17 at a predetermined pressure in the chamber 12. A spring 74 constituting a resilient means is located within the cup 36 and between the bottom of the cup and the disc 72, the spring 74 tending to urge the disc 72 and the attached pad 73 outwardly. A retaining ring 75 is fastened internally of the cup 36 and engages the periphery of the disc 72 to limit its outward movement.

The casing structure for the valve body 10 includes a back plate 76 having an inwardly projecting, substantially square-shaped boss 77 that engages the rear side of the center valve body portion 11. The back plate 76 is secured to the center valve body portion 11 by a pair of screws 80 extending through the boss 77. The boss 77 is provided with a pocket 81 that communicates with the transverse passage 23 in the valve body 11. A threaded outlet 82 is provided in the back plate 76 which communicates with the pocket 81. Extending around the pocket 81 and held by the boss 77 is an O-ring 83, the O-ring 83 engaging the valve body 11 to provide an effective seal. An elbow fitting 84 is fastened to the back plate 76 and communicates with the flow passage through the outlet 82.

In addition, the back wall 76 is provided with an arcuate recess or depression 85 in which the knob 32 fits. Consequently, the back plate 76 engages the opposite sides of the knob 32 and prevents any axial movement relative to the valve body 10, yet enables rotative movement of the knob 32 incident to adjusting the longitudinal axial position of rod 16.

The back plate 76 also includes an arcuate top wall 86 that extends forwardly and cooperates with the other part of the casing structure. This other part is comprised of a front box generally indicated by 87, having a front wall 90, opposed end walls 91 and 92, a top wall 93 and a bottom wall 94. Tapped casing portions are provided within the front box 87 to receive screws 95 extending through the back plate 76, the screws 95 securely fixing the back plate 76 to and within the front box 87.

The front wall 90 is provided with an elongate slot 96 through which the knob 32 projects. Thus it is seen that the knob 32 is readily accessible for digital movement and adjustment.

A window 97 is formed in the front wall 90 immediately in front of the vertical portion 70 of the target plate 65. Another window 100 is formed in the arcuate top wall 93 immediately above the arcuate portion 71 of the target plate 65. A transparent member 101 is fixed by pin 102 to the inside of front wall 90, the transparent member 101 covering the windows 97 and 100. A scale is provided on the transparent member 101 immediately behind each of the windows 97 and 100 so that the flag 51 will indicate on both of these scales the pressure condition in the chamber 12 at one side of the diaphragm 34.

Formed in the bottom wall 94 of the front casing box 87 is an aperture 103 through which an inlet fitting 104 projects. The inlet fitting 104 communicates directly with the valve chamber 12 through an inlet 105 provided in the center valve body portion 11, the fitting 104 being threadedly connected to the center valve body portion 11 in the inlet 105. An O-ring 106 is held by the valve body 11 and is disposed about the inlet 105 to provide an effective seal between the valve body 11 and the inlet fitting 104.

It is thought that the operation and functional advantages of the combined gauge and regulator have become fully apparent from the foregoing detailed description of parts, but for completeness of disclosure the usage will be briefly described.

It will be assumed that the unit has been connected in a suction line, the inlet 105 and outlet 82 being interconnected by a flow passage that includes the chamber 12 at the front side of the diaphragm 34. This flow passage is from the inlet 105 into the chamber 12, and thence through the discharge orifice 17 and the rod passage 20, and thence through the rod port 21 and through the transverse valve body passage 23 to the outlet 82.

To provide an accurate initial setting of the gauge means, the adjusting nut 43 is threadedly adjusted on the plunger 40 to vary the pressure of spring 50 until the flag 51 reads zero on the indicating scales. The spring 50 tends at all times to urge the plunger 40 to its fully extended position illustrated in FIG. 9. When the plunger 40 is in the fully extended position the rack 42 acts through the meshing pinion 63 to pivot the flag 51 to the position whereby the flag 51 indicates a zero pressure in chamber 12. In this initial position, the diaphragm 34 is located at one end of the chamber 12 so that the valve pad 73 is disengaged from the rod 16 and the discharge orifice 17 is open for a free flow through the valve. This spring pressure is in direct opposition to the pressure in chamber 12 exerted on one side of the diaphragm 34 when the suction is created in the suction line.

When the suction is created in the suction line, the pressure in chamber 12 is reduced, thereby causing the diaphragm 34 to move to the right from the position shown in FIG. 9 to position shown in FIG. 8. As the diaphragm 34 flexes in response to this reduced pressure, the plunger 40 will move rectilinearly to a retracted position against the loading of spring 50. The rack 42 turns the pinion 63 in response to the change of plunger position, and consequently the flag 51 is pivoted a corresponding distance so that the flag 51 indicates on the scales the pressure condition in chamber 12 that causes the particular extent of diaphragm and plunger movement. Therefore, the flag 51 accurately depicts on the scale the true pressure in the suction line.

At a predetermined pressure in the chamber 12, the valve pad 73 will engage the inner end of rod 16 and close the discharge orifice 17, and thereby stop flow through the suction line. The valve pad 73 can be depressed against the loading of spring 74 upon engagement with the rod end to eliminate any hunting of the pad 73 for an effective seat on the rod, whereby an effective closure of the discharge orifice is realized.

The predetermined pressure in chamber 12 at which the discharge orifice 17 is closed by valve pad 73 upon the flexing action of diaphragm 34 can be conveniently and readily regulated simply by turning the knob 32. For example, upon turning the knob 32 in one direction the threaded interaction between the sleeve 27 and the threaded rod portion 24 causes the rod 16 to move rectilinearly in a direction to place the discharge orifice 17 at a relatively closer distance to the valve pad 73, as is suggested by the broken lines in FIG. 9. As a result, the valve pad 73 need move a shorter distance before engaging the rod end and closing the discharge orifice 17. This is accomplished by a flexing action of diaphragm 34 and is caused at a relatively lower suction pressure. Naturally, this predetermined pressure at which the discharge orifice 17 is closed is readily read on the scales as indicated by flag 51 acting in response to the rectilinear movement of plunger 40. This predetermined cut-off pressure can be accurately regulated to any value within a wide range simply by adjusting the rectilinear position of rod 16, and hence the distance of the discharge orifice 17 from the valve pad 73, by turning the knob 32 in one direction or the other.

From the above description, it is seen that as the diaphragm 34 flexes in response to the pressure condition in chamber 12, the device acts as a gauge in that the pressure condition at any time can be conveniently determined by reading the scale value indicated by flag 51. When the diaphragm 34 flexes a sufficient distance so that the valve pad 34 closes the discharge orifice 17, then it will be understood that the device is acting as a regulator in that flow through the valve body is halted at a predetermined pressure in the chamber 12, which pressure is also readable by the gauge means. The device also acts as a regulator in that the predetermined cut-off pressure can be precisely determined and regulated.

Although the invention has been described by making detailed reference to a single preferred embodiment, such detail is to be understood in an instructive, rather than in any restrictive sense, many variants being possible within the scope of the claims hereunto appended.

I claim as my invention:
1. A combined gauge and regulator comprising:
 (a) a valve body having a chamber,
 (b) a flexible element across the chamber, one side of the flexible element being subjected to the pressure in the chamber,
 (c) a rod reciprocatively mounted in the body, the rod having one end extending into the chamber, the rod being provided with a discharge orifice in the rod end communicating with the chamber at the one side of the flexible element,
 (d) the body including an inlet communicating with the chamber at the same side of the flexible element and an outlet communicating with the discharge orifice through the rod,
 (e) a plunger attached to the flexible element and reciprocatively mounted in the valve body,
 (f) the plunger being provided with a rack,
 (g) an indicating element pivotally mounted on the valve body,
 (h) a gear train interconnecting the rack with the indicating element including a pinion meshing with the rack and actuating the indicating element in response to the position of the plunger upon movement of the flexible element in the chamber,
 (i) a valve member carried by and movable with the flexible element, the valve member opening and closing the discharge orifice,
 (j) a resilient means connected to the plunger and exerting a force on the flexible element in opposition to the pressure in the chamber at the said one side of the flexible element,
 (k) the rod including a threaded portion,
 (l) a sleeve threadedly connected to the threaded rod portion,
 (m) a knob attached to the sleeve for turning the sleeve on the threaded rod portion,
 (n) key means interconnecting the rod and body, and
 (o) means cooperating with the knob and sleeve to cause reciprocative, rectilinear longitudinal move- ment of the rod without rotation upon threaded adjustment of the sleeve by the knob, whereby to set the discharge orifice at a predetermined distance from the valve member to determine the chamber pressure at the one side of the flexible motor element at which the motor element causes the valve member to open or close the discharge orifice.

2. A combined gauge and regulator comprising:
(a) a body having a chamber,
(b) a flexible element in the chamber subjected on one side to the pressure in the chamber,
(c) a valve seat including a rod reciprocatively mounted in the body for movement toward or away from the flexible element, the rod being provided with an orifice that constitutes a discharge from the chamber, the orifice communicating with the chamber at one side of the flexible element and adapted to be operatively opened or closed by the flexible element,
(d) the body including an inlet communicating with the chamber at the same side of the flexible element and an outlet communicating with the orifice,
(e) means operatively exerting a pressure on the flexible element in opposition to the pressure in the chamber at the said one side of the flexible element,
(f) the rod including a threaded portion,
(g) a sleeve threadedly connected to the threaded rod portion,
(h) a knob attached to the sleeve for turning the sleeve on the threaded rod portion,
(i) key means precluding rotation of the rod yet enabling reciprocative movement of the rod upon turning the knob, whereby the distance between the discharge orifice and the flexible element and the position of the discharge orifice in the chamber can be precisely regulated to determine the pressure limit in the chamber at the said one side of the flexible element at which the flexible element will operatively close the discharge orifice, and
(j) a gauge means operatively connected to the flexible element to indicate the chamber pressure.

3. A combined gauge and regulator comprising:
(a) a body having a chamber,
(b) a flexible element in the chamber subjected on one side to the pressure in the chamber,
(c) a valve seat including a rod reciprocatively mounted in the body for movement toward or away from the flexible element, the rod having one end extending into the chamber, the rod end being provided with an orifice that constitutes a discharge from the chamber and adapted to be operatively opened or closed by the flexible element,
(d) the body including an inlet communicating with the chamber at the same side of the flexible element and an outlet communicating with the orifice,
(e) means operatively exerting a pressure on the flexible element in opposition to the pressure in the chamber at the said one side of the flexible element,
(f) the rod including a threaded portion,
(g) a sleeve threadedly connected to the threaded rod portion,
(h) a knob attached to the sleeve for turning the sleeve on the threaded rod portion,
(i) key means interconnecting the rod and body precluding rotation of the rod yet enabling translatory longitudinal movement,
(j) means cooperating with the knob and sleeve to cause reciprocative movement of the rod upon threaded adjustment of the sleeve by the knob to locate the discharge orifice in a predetermined position in the chamber relative to the flexible element to determine the pressure limit in the chamber at the said one side of the flexible element at which the flexible element will operatively close the discharge orifice, and (k) a gauge means operatively connected to the flexible element to indicate the chamber pressure.

4. A combined gauge and regulator comprising:
(a) a body having a chamber,
(b) a flexible element in the chamber subjected on one side to the pressure in the chamber,
(c) a valve seat provided with an orifice communicating with the chamber at one side of the flexible element and adapted to be operatively opened or closed by the flexible element,
(d) the body including an inlet communicating with the chamber at the same side of the flexible element and an outlet communicating with the orifice,
(e) a plunger attached to the flexible element and reciprocatively mounted in the body,
(f) means including a resilient member connected to the plunger operatively exerting a pressure on the flexible element in opposition to the pressure in the chamber at the said one side of the flexible element,
(g) means adjustably mounting the valve seat to set the orifice at a predetermined distance from the flexible element to determine the chamber pressure at the said one side of the flexible element at which the flexible element will operatively open or close the orifice,
(h) a gauge means operatively connected to the plunger and movable in response to the position of the plunger upon movement of the flexible element caused by the pressure differential of the said chamber pressure and the pressure of the resilient member, and
(i) a nut threadedly connected to the plunger and engaging the resilient member to vary the loading selectively on the flexible element and initially position the plunger in order to provide only an initial setting of the gauge means.

5. A combined gauge and regulator comprising:
(a) a body having a chamber,
(b) a flexible element in the chamber subjected on one side to the pressure in the chamber,
(c) a rod reciprocatively mounted in the body and having one end extending into the chamber, the rod being provided with a discharge orifice in the rod end communicating with the chamber at one side of the flexible element and adapted to be operatively opened or closed by the flexible element,
(d) the body including an inlet communicating with the chamber at the same side of the flexible element and an outlet communicating with the discharge orifice through the rod,
(e) a plunger attached to the flexible element and reciprocatively mounted in the body for movement with the flexible element,
(f) a spring located about and connected to the plunger, the spring exerting a force on the flexible element in opposition to the pressure in the chamber at the said one side of the flexible element,
(g) means adjustably positioning the rod to place the discharge orifice at a predetermined distance from the flexible element to determine the chamber pressure at the said one side of the flexible element at which the flexible element will operatively open or close the discharge orifice,
(h) a gauge means operatively connected to the plunger and movable in response to the position of the plunger upon movement of the flexible element to indicate the said pressure chamber, and
(i) a nut threadedly connected to the plunger and engaging the spring, the nut being adjustable along the plunger to vary the loading by the spring selectively on the flexible element in order to provide the initial setting of the gauge means while the means adjusting the position of the rod orifice in the chamber determines the said predetermined chamber pressure at which the flexible element opens or closes the discharge orifice.

6. A combined gauge and regulator comprising:
(a) a body having a chamber,
(b) a flexible element in the chamber subjected on one side to the pressure in the chamber,
(c) a rod reciprocatively mounted in the body and having one end extending into the chamber, the rod being provided with a discharge orifice in the rod end communicating with the chamber at one side of the flexible element and adapted to be operatively opened or closed by the flexible element, the rod including a threaded portion,
(d) the body including an inlet communicating with the chamber at the same side of the flexible element and an outlet communicating with the discharge orifice through the rod,
(e) a plunger attached to the flexible element and reciprocatively mounted in the body for movement with the flexible element,
(f) a spring engaging the plunger and exerting a force on the flexible element in opposition to the pressure in the chamber at the said one side of the flexible element,
(g) a sleeve threadedly connected to the threaded rod portion,
(h) a knob attached to the sleeve for turning the sleeve on the threaded rod portion,
(i) key means precluding rotation of the rod yet enabling longitudinal, rectilinear movement of the rod upon turning the knob to place the discharge orifice in the rod at a desired adjusted position so as to determine the chamber pressure at the said one side of the flexible element at which the flexible element will operatively open or close the discharge orifice,
(j) a gauge means operatively connected to the plunger and movable in response to the position of the plunger upon movement of the flexible element to indicate the said chamber pressure, and
(k) a nut threadedly connected to the plunger and engaging the spring to vary the spring loading on the flexible element in order to provide only an initial setting of the gauge means.

7. A combined gauge and regulator comprising:
(a) a body having a chamber,
(b) a flexible element in the chamber subjected on one side to the pressure in the chamber,
(c) a valve seat provided with an orifice communicating with the chamber at one side of the flexible element,
(d) a valve member carried by the flexible element and adapted to engage the valve seat to open or close the orifice,
(e) the body including an inlet communicating with the chamber at the same side of the flexible element and an outlet communicating with the orifice,
(f) means operatively exerting a pressure on the flexible element in opposition to the pressure in the chamber at the said one side of the flexible element,
(g) means adjustably mounting the valve seat to set the orifice at a predetermined distance from the flexible element to determine the chamber pressure at the said one side of the flexible element at which the valve member will operatively open or close the orifice,
(h) means resiliently mounting the valve member so that the valve member yields when engaging the valve seat upon closing the orifice to accommodate any adjusted position of the valve seat, the orifice receiving the discharge flow from the chamber so that the valve member is prevented from fluttering when the orifice is closed, and
(i) a gauge means operatively connected to the flexible element to indicate the chamber pressure.

8. A combined gauge and regulator comprising:
(a) a body having a chamber,
(b) a flexible element in the chamber subjected on one side to the pressure in the chamber,
(c) a cup attached to the flexible element,
(d) a valve member located in the cup,
(e) a valve seat provided with an orifice communicating with the chamber at one side of the flexible element and adapted to be operatively opened or closed by the valve member,
(f) the body including an inlet communicating with the chamber at the same side of the flexible element and an outlet communicating with the orifice,
(g) means operatively exerting a pressure on the flexible element in opposition to the pressure in the chamber at the said one side of the flexible element,
(h) means adjustably mounting the valve seat to set the orifice at a predetermined distance from the flexible element to determine the chamber pressure at the said one side of the flexible element at which the valve member will operatively open or close the orifice,
(i) resilient means in the cup tending to urge the valve member to an outer limit, the valve member moving away from the limit against the loading of the resilient means when engaging the valve seat upon closing the orifice to accommodate any adjusted position of the valve seat,
(j) the orifice receiving the discharge flow from the chamber so that the valve member is prevented from fluttering when the orifice is closed, and
(k) a gauge means operatively connected to the flexible element to indicate the chamber pressure.

References Cited by the Examiner

UNITED STATES PATENTS

| | | | |
|---|---|---|---|
| 365,656 | 6/1887 | Warren | 137—510 X |
| 638,251 | 12/1899 | Kleinfeldt | 137—505.39 |
| 1,119,042 | 12/1941 | Ricketts. | |
| 1,265,693 | 5/1918 | Manning | 137—510 X |
| 1,314,977 | 9/1919 | Neal | 137—510 X |
| 1,538,558 | 5/1925 | Ileman | 137—505.13 X |
| 1,998,761 | 4/1935 | Hueber. | |
| 2,311,110 | 2/1943 | Johnson | 251—85 X |
| 2,911,186 | 7/1956 | Knox | 251—267 X |
| 3,053,272 | 9/1962 | Babson | 137—505.13 |
| 3,134,400 | 5/1964 | Schifter | 137—505.39 X |
| 3,144,011 | 9/1964 | Anthes | 137—505.13 X |
| 3,145,731 | 9/1964 | Kaatz | 137—510 |

WILLIAM F. O'DEA, *Primary Examiner.*

ISADOR WEIL, *Examiner.*

H. WEAKLEY, *Assistant Examiner.*